(No Model.)
E. WESTON.
ELECTRIC MEASURING INSTRUMENT.
No. 444,805.                  Patented Jan. 13, 1891.
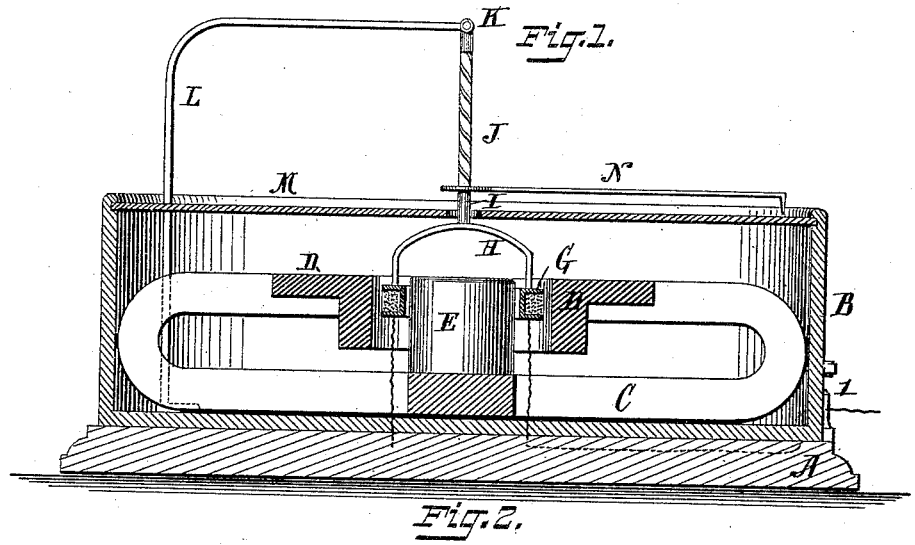
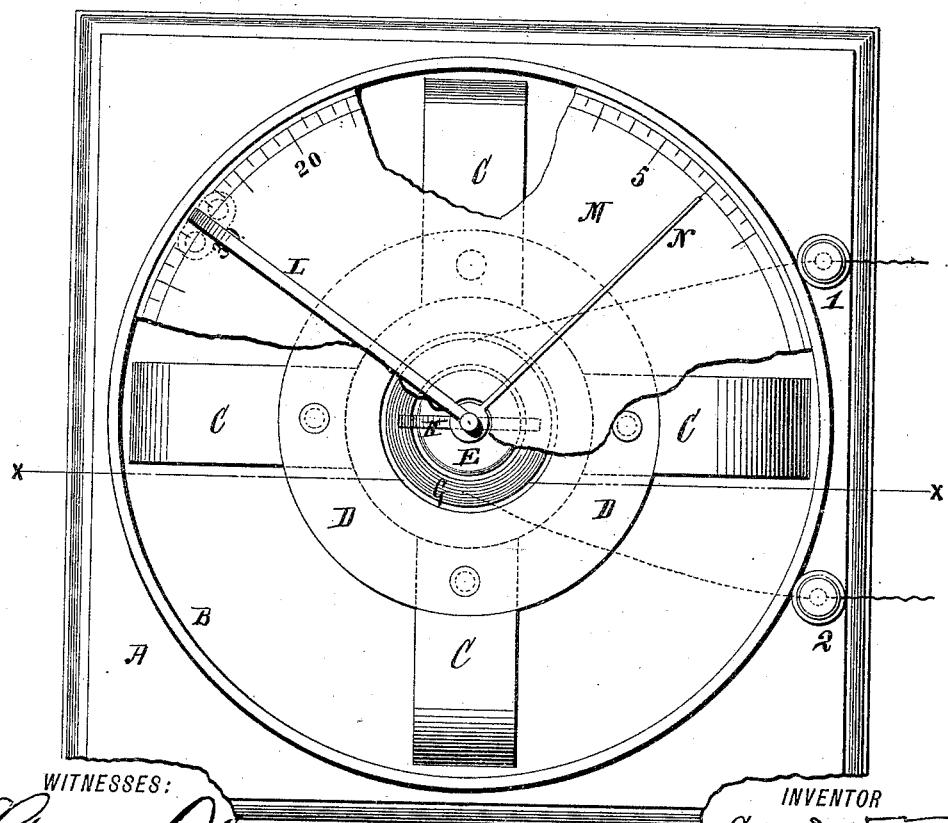
WITNESSES:
Gustave Dieterich
M. Bosch
INVENTOR
Edward Weston
By Park Benjamin
his ATTORNEY

UNITED STATES PATENT OFFICE.

EDWARD WESTON, OF NEWARK, NEW JERSEY.

ELECTRIC MEASURING-INSTRUMENT.

SPECIFICATION forming part of Letters Patent No. 444,805, dated January 13, 1891.

Application filed October 18, 1888. Renewed October 16, 1890. Serial No. 368,279. (No model.)

*To all whom it may concern:*

Be it known that I, EDWARD WESTON, of Newark, Essex county, New Jersey, have invented a new and useful Improvement in Electrical Measuring-Instruments, of which the following is a specification.

The invention relates to an apparatus more particularly intended to measure the electromotive force of an electrical current in volts.

My invention consists in an electrical measuring-instrument in which an electrical conductor in loop form is supported in the field of force of a magnet and is free to move bodily in said field under the influence of the current traversing the loop. The motion of the conductor is opposed and equilibrated by a spring, and the extent of its movement is shown upon a suitable scale.

In the accompanying drawings, Figure 1 is a sectional view on the line $x\ x$ of Fig. 2. Fig. 2 is a plan view of the instrument.

Similar letters and figures of reference indicate like parts.

A is the base-board, and B the inclosing-case of the instrument.

C is a permanent magnet, having four radial arms, which are bent over, as shown, and which together at their extremities receive the flanged ring D. Said ring, therefore, forms one of the pole-pieces of the magnet. Rising from the center of the magnet C is a cylinder E of magnetic material, which forms the other pole-piece of the magnet. The cylinder E is received within the ring D, so that between the outer periphery of cylinder E and the inner periphery of ring D a very intense magnetic field is produced.

G is a grooved or channeled ring of copper or other diamagnetic material, upon which is wound a coil of insulated wire. Said ring G is supported in the annular space between the pole-pieces D and E by means of the bail H, which is secured to a short rod I, fastened to the lower end of the spiral spring J. The upper end of spring J is secured to a short rod K, which in turn is fastened to the extremity of the fixed arm L, which is supported upon the base of the instrument. The short rod I passes through an opening in the scale-plate M, which covers the upper part of the case B and is free to turn in said opening. Above said scale-plate rod I carries a needle or pointer N, the end of which sweeps over the scale-markings. One terminal of the coil of wire supported upon the ring G connects with the binding-post 1, and the other terminal connects with the binding-post 2. The circuit in the instrument is therefore from binding-post 1 through the coil to the binding-post 2.

The operation of the instrument is as follows: When the coil supported on ring G is traversed by a current, it becomes equivalent to a magnetic shell whose edges coincide in position with the coil, so that said coil is attracted or repelled by a magnet just exactly as its equivalent magnetic shell would be attracted or repelled. Hence when the current circulates through the coil the coil tends to move downward along the cylinder E and the force with which the coil will be so drawn downward will be proportional to the strength of the current traversing said coil. I balance against the downward pull of the coil the resistance of a suspended spring J, which uniformly increases in direct proportion to the extent of downward movement of the coil, so that as the extent of the downward movement of the coil is proportional to the strength of the current it follows that the effect of the current tending to move the coil is equilibrated against the elastic resistance of the spring, and hence the coil will take a certain definite position due to the resultant action of both opposing forces. It would be obviously possible to arrange in connection with the coil any simple gage showing the extent of its movement, and hence the strength of the current causing that movement. I prefer, however, both for the sake of convenience and because of the accuracy of its operation, to employ the device herein illustrated, in which the needle N, connected to the rod I, extends over a uniformly-divided scale. When the ring G descends, as already described, the spring J rotates and the arc of its rotation is practically proportional to the extent of movement of its free end, which carries the ring G. It follows, therefore, that the needle N, supported on the rod I, moves over distances upon its scale (which is laid off in equal divisions,) exactly proportional to the extent of downward movement of the ring G, and therefore, as already explained, the position of the needle on the scale indicates the strength of the current, affecting the instrument. I propose, however, to use this apparatus, preferably for the measurement of current pressure or electro-motive force in volts. Therefore I may place in the circuit a resistance high in proportion to the internal resistance of the dynamo or battery, the current-pressure of which is to be measured. The strength of the current affecting the coil will then depend only on the difference of potential existing between the terminals of the interposed resistance. Consequently the coil will move and the needle will swing over distances on its scale exactly proportional to the electro-motive force of the current traversing the coil. In order to dampen the movement of the coil, or, in other words, to prevent undue oscillation or vibration of the needle, I construct the ring G of copper or diamagnetic metal, the movement of which, as is well known, becomes retarded or opposed in a strong magnetic field.

I claim—

1. In an electrical measuring-instrument, a magnet, an electrical conductor in loop form loosely surrounded peripherically by one pole of said magnet, and a means of indicating the extent of movement of said conductor due to the passage of a current through the same, substantially as described.

2. In an electrical measuring-instrument, a magnet, an electrical conductor in loop form loosely surrounding one pole thereof and itself peripherically surrounded by the other pole, and a means of indicating the extent of movement of said conductor due to the passage of a current through the same, substantially as described.

3. In an electrical measuring-instrument, a magnet having a vertical polar extremity, a coil horizontally suspended in the field of force of said pole, and a torsion-spring capable of rotation on its axis when the coil moves up or down, the said coil being suspended by said spring from a fixed support, substantially as described.

4. In an electrical measuring-instrument, a magnet having a vertical polar extremity, a coil horizontally suspended in the field of force of said pole, a torsion-spring whereby said coil is suspended, said spring being capable of rotation on its axis when said coil moves up or down, and an indicator-needle projecting from said spring, substantially as described.

5. The combination of the permanent magnet C, having the vertical cylindrical pole-piece E and an annular pole-piece D surrounding said pole-piece E, the coil G, supported in the annular space between said pole-pieces, spring H, from which said coil is suspended, a fixed support for said spring, a needle N, secured to said spring, and a fixed scale M for indicating the deflections of said needle, substantially as described.

EDWARD WESTON.

Witnesses:
PARK BENJAMIN,
M. BOSCH.